US011782177B2

(12) United States Patent
Angelovich et al.

(10) Patent No.: US 11,782,177 B2
(45) Date of Patent: Oct. 10, 2023

(54) RECOMMENDATION ENGINE FOR AUTOMATED SEISMIC PROCESSING

(71) Applicant: Landmark Graphics Corporation, Houston, TX (US)

(72) Inventors: Steven Angelovich, Houston, TX (US); Manisha Bhardwaj, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 120 days.

(21) Appl. No.: 17/557,287

(22) Filed: Dec. 21, 2021

(65) Prior Publication Data
US 2023/0194740 A1    Jun. 22, 2023

(51) Int. Cl.
*G01V 1/32* (2006.01)
*G01V 1/28* (2006.01)
*G01V 1/30* (2006.01)

(52) U.S. Cl.
CPC .............. *G01V 1/325* (2013.01); *G01V 1/282* (2013.01); *G01V 1/306* (2013.01); *G01V 2210/66* (2013.01)

(58) Field of Classification Search
CPC ........ G01V 1/325; G01V 1/282; G01V 1/306; G01V 2210/66
See application file for complete search history.

(56) References Cited

U.S. PATENT DOCUMENTS 11,486,230 B2 * 11/2022 Tawil ..................... G06Q 50/02

2021/0302606 A1 *  9/2021 Al-Saleh ................ G01V 1/282
2021/0319304 A1 * 10/2021 Tawil ...................... E21B 49/00
2023/0152480 A1 *  5/2023 Singh ..................... G01V 1/364
                                                              702/17

OTHER PUBLICATIONS

Noufal et al., Machine Learning in Computer Vision Software for Geomechanics Modeling, 2021, Society of Petroleum Engineers, SPE-2080149-MS, pp. 1-20 (Year: 2021).*
Badar et al., Seismic Interpretation Technologies Advancement and its Impact on Interactive and Iterative Interpretation Workflows, 2022, International Petroleum Technology Conference, IPTC-21920-EA, pp. 1-11 (Year: 2022).*
Brown et al., "Optimizing Performance of Data Processing," First Break, vol. 37, Issue 12, Dec. 2019, pp. 47-50.
Long et al., "Automation of Marine Seismic Data Processing," The Leading Edge, vol. 39, Issue 4, Apr. 2020, pp. 226-296.

* cited by examiner

*Primary Examiner* — Mischita L Henson
(74) *Attorney, Agent, or Firm* — DELIZIO, PEACOCK, LEWIN & GUERRA

(57) ABSTRACT

System and methods for automated seismic processing are provided. Historical seismic project data associated with one or more historical seismic projects is obtained from a data store. The historical seismic project data is transformed into seismic workflow model data. At least one seismic workflow model is generated using the seismic workflow model data. Responsive to receiving seismic data for a new seismic project, an optimized workflow for processing the received seismic data is determined based on the at least one generated seismic workflow model. Geophysical parameters for processing the seismic data with the optimized workflow are selected. The seismic data for the new seismic project is processed using the optimized workflow and the selected geophysical parameters.

20 Claims, 7 Drawing Sheets

RECOMMENDATION ENGINE FOR AUTOMATED SEISMIC PROCESSING

FIELD OF THE DISCLOSURE

The present disclosure relates generally to seismic data processing and particularly, to automated workflows for processing seismic data for hydrocarbon exploration and recovery.

BACKGROUND

Knowing the properties and locations of underground rock formations is critical for making decisions as to where and how to economically produce hydrocarbons from underground reservoirs. In the field of hydrocarbon exploration and production, seismic imaging techniques may be used to gain an understanding of the depth and structures of subsurface geological formations. Various seismic sources, such as dynamite, "thumper" trucks, air guns, and other noise sources located at the surface of a hydrocarbon bearing field, may be used to propagate seismic waves through an underground formation. Seismic data traces provide a record of the sound wave reflections acquired from the underground formation. Such data traces may be used to generate three-dimensional images of subsurface geological structures, including faults and other stratigraphic features that trap hydrocarbon and mineral deposits.

Traditional seismic data processing methods require users to leverage domain expertise in applying the appropriate geophysical workflows and algorithms for processing seismic data. Geophysicists usually process seismic data using a seismic processing software application in which geophysical algorithms are applied with an appropriate set of parameters to transform field data into curated seismic volumes suitable for interpretation. Even with the aid of computer software, conventional seismic data processing workflows are generally time-consuming and require rigorous human interaction. Identifying and validating different parameter combinations for a geophysical algorithm is largely a manual process that may need to be performed numerous times to achieve desirable results. Consequently, conventional seismic data processing workflows tend to be highly iterative and non-linear, where the data may need to be processed over multiple iterations to find the right set of parameters for a given algorithm. This makes the entire seismic processing workflow computationally expensive and prone to human judgment and error.

DESCRIPTION OF ILLUSTRATIVE EMBODIMENTS

Figure 1:
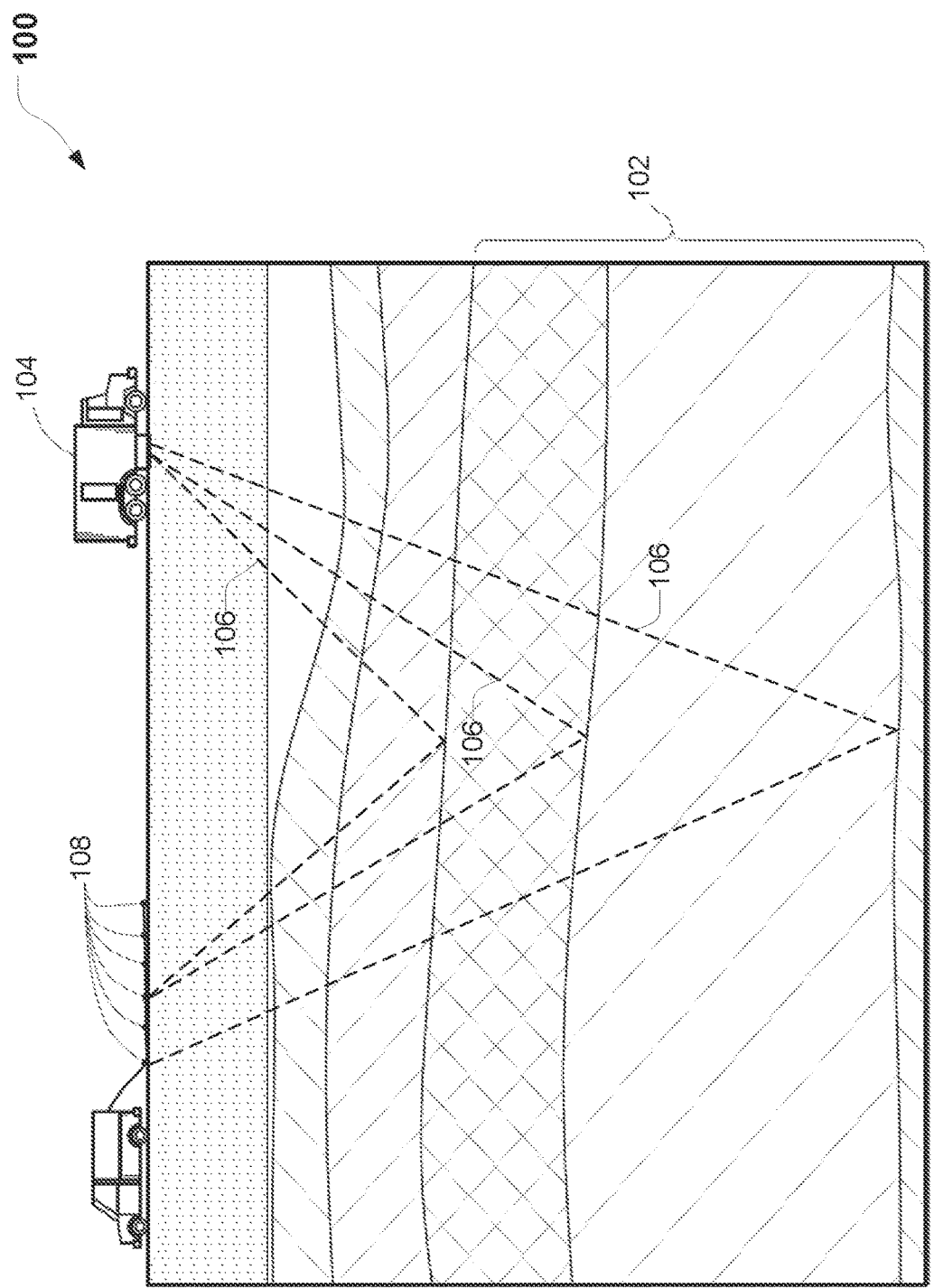
FIG. 1 is a side elevation view of a surface seismic survey system for collecting seismic data from a subsurface formation.

Embodiments of the present disclosure relate to automated seismic data processing using a recommendation engine with machine learning models for recommending optimal steps in a seismic data processing workflow and/or optimal parameters of a geophysical algorithm to use at each step of the workflow. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As will be described in further detail below, embodiments of the present disclosure may be used to provide a recommendation engine with data-driven machine learning (ML) models for automating seismic data processing workflows. Such a seismic processing workflow may include, for example, a sequence of individual processing steps in which a geophysical, mathematical, or statistical algorithm is applied with an appropriate set of parameters to process seismic data at each step. The goal of seismic data processing may be to convert raw field data into curated seismic volumes that are suitable for interpretation and provide a relatively high-quality image of subsurface layers over time or depth. In a traditional workflow, the number of processing steps, their order of application, and the parameters used for each algorithm may vary depending on the expertise of the user (or "processor"), e.g., a geophysicist, and complexity of the formation under review. By contrast, the disclosed techniques leverage historical data regarding seismic processing workflows that were previously performed on historical seismic datasets to build a seismic processing workflow recommendation engine for automating the processing workflow for a new seismic dataset. The historical data may be acquired by the recommendation engine from a variety of data sources including, for example, a cloud-based repository of historical data from prior seismic processing projects.

In one or more embodiments, sequence prediction modeling techniques may be used to extract relevant information from historical processing sequences and develop data-driven ML models that are trained for predictive analytics. Feedback from experts in the domain may also be used to retrain the ML models of the recommendation engine as needed or desired to further enhance the engine's prediction accuracy and reliability. The ML models may include various interconnected but independent workflow recommendation models. Such recommendation models may include, for example, a sequence prediction model and a parameter recommendation model. The sequence prediction model may be used to predict or recommend an optimal seismic processing workflow for processing a seismic dataset, including the optimal sequence of steps to perform in such a workflow. The parameter recommendation model may be used to recommend an optimal set of parameters for a geophysical algorithm to use in each step of the workflow recommended by the sequence prediction model. By utilizing data-driven machine learning models for recommending optimal next steps in a processing sequence and/or optimal parameters of a geophysical algorithm to use at each step, the seismic data processing workflow may be automated. This not only eliminates the heuristic approach used in conventional seismic data processing solutions, but also provides a robust, scalable, time-efficient, and data-driven solution for processing seismic volumes.

It should be appreciated that the recommendation models described above may be used together or independently. For example, the sequence prediction model may be used to predict or recommend a geophysical algorithm to apply in a processing sequence while the parameter recommendation model may be used to optimize the parameters of the specific algorithm that was recommended, thereby providing a complete predictive data-driven automated seismic processing solution. Alternatively, a user may select the geophysical algorithm to apply for processing the data in one or more of the steps in a processing sequence of a workflow but leverage parameter recommendation model to recommend a set of optimal parameters for the selected algorithm, resulting in a partially or semi-automated workflow. In another example of a semi-automated workflow, sequence prediction model can be used to obtain the recommended workflow for processing a seismic volume while the user may manually select and finalize parameters of the predicted/recommended geophysical algorithms for one or more steps of the processing workflow.

In some implementations, the data-driven ML modeling techniques disclosed herein may be encapsulated and seamlessly integrated within a seismic data analysis and processing application executable at a user's computing device. Such an application may provide, for example, automated seismic processing workflow functionality via a recommendation engine, in which complex statistical analysis and modeling features may be implemented in the background and kept hidden from the user. Such features may be accessed by the user via a relatively straightforward or standard graphical user interface for seismic data processing and interpretation. By leveraging the predictive capabilities of the disclosed recommendation models, the labor-intensive and time-consuming tasks associated with conventional seismic data processing solutions can be replaced with an automated workflow that significantly reduces the amount of time required to process seismic data and determine optimal parameters for seismic interpretation.

Illustrative embodiments and related methodologies of the present disclosure are described below in reference to FIGS. 1-7 as they might be employed, for example, in a computer system for seismic data processing and interpretation. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation regarding the environment, architecture, design, or process in which different embodiments may be implemented.

FIG. 1 illustrates an example of a seismic survey system 100 for collecting seismic data from a subsurface reservoir formation 102. In this example, seismic surveying along with other available geophysical, borehole, and geological data may be used to provide information about the structure and distribution of rock types and properties of different layers of the subsurface formation. While seismic survey system 100 is described in the context of land-based seismic surveying, it should be noted that the seismic data processing techniques disclosed herein are not intended to be limited thereto and that these techniques may be applied to seismic surveys performed on land or in water, e.g., as part of an onshore or off-shore drilling operation, respectively.

FIG. 1 shows a side elevation view of seismic survey system 100 relative to subsurface formation 102. Subsurface formation 102 may be, for example, a hydrocarbon bearing formation including a plurality of rock layers. System 100 may be used to conduct a surface seismic survey that provides a seismic mapping of formation 102. System 100 includes a seismic source 104 and an array of seismic receivers 108. As shown in FIG. 1, seismic source 104 may be a specialized "thumper" truck that generates seismic energy 106. However, it should be noted that embodiments are not limited thereto and that seismic source 104 may be implemented using any of various other types of seismic sources including, but not limited to, air guns, dynamite, or other types of explosives.

In conducting the surface seismic survey, seismic energy 106 may be shot from source 104 in the form of pulses or waves that propagate to and encounter different layers of formation 102. For each layer encountered, a portion of seismic energy 106 is reflected back towards the earth's face and received by one or more receiver devices in the array of seismic receivers 108 at the surface. Each receiver may be a surface seismic sensor, e.g., a geophone or hydrophone, for detecting waves of seismic energy 106 shot from source 104A and recording arrival times and amplitudes of the detected waves.

The surface seismic survey conducted using system 100 may be, for example, an initial exploratory survey conducted over a relatively large area of earth in order to obtain a low-resolution mapping of the geometry of subsurface formation 102. Such a broad-based seismic survey may be used in conjunction with core samples and/or well logs from one or more exploratory wellbores for purposes of hydrocarbon exploration and well planning From the initial exploratory survey, a determination as to which specific location is likely to contain hydrocarbons may be made. For further exploration and planning purposes, a more detailed vertical seismic profile (VSP) survey of the particular location may be conducted.

In one or more embodiments, the seismic data collected by the seismic survey system 100 of FIG. 1 may be processed as part of a seismic processing workflow implemented in a seismic data analysis and processing application executable at a user's computing device. As described above, the seismic data analysis and processing application may include a recommendation engine that employs various machine learning (ML) models to automate the workflow by predicting or recommending an optimal sequence of operations or steps to be performed for processing the seismic data and/or an optimal set of parameters for a specific geophysical algorithm to be used at each step of the processing sequence. An example of such a recommendation engine will be described in further detail below with reference to FIG. 2.

Figure 2:
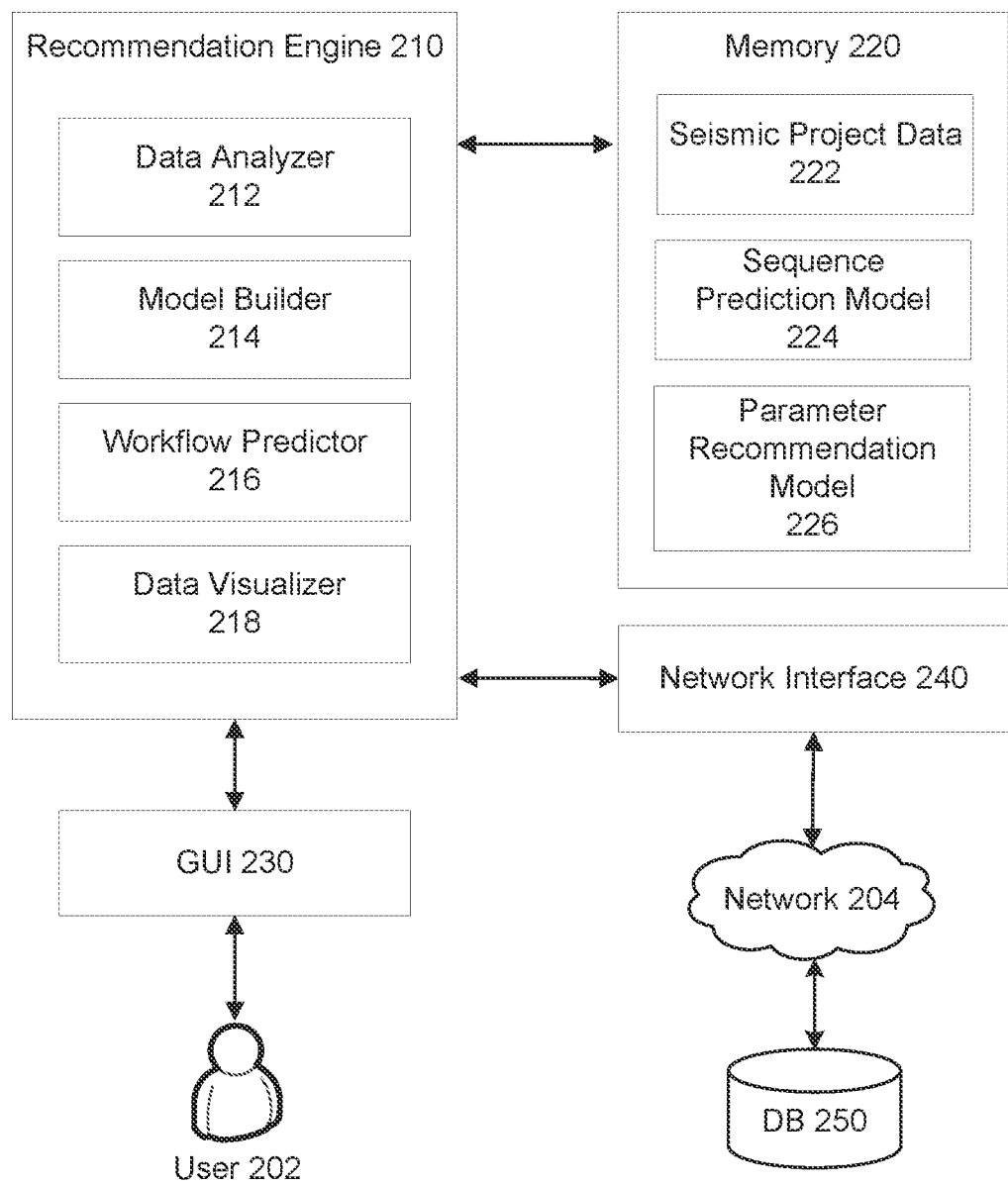
FIG. 2 is a block diagram of an illustrative system for automating seismic data processing using a recommendation engine.

FIG. 2 is a block diagram of a system 200 for automating seismic data processing workflows using a recommendation engine. As shown in FIG. 2, system 200 includes a recommendation engine 210, a memory 220, a graphical user interface (GUI) 230, and a network interface 240. Recommendation engine 210 includes a data analyzer 212, a model builder 214, a workflow predictor 216, and a data visualizer 218. In one or more embodiments, recommendation engine 210, memory 220, GUI 230, and network interface 240 may be communicatively coupled to each other via an internal bus of system 200.

System 200 may be implemented using any type of computing device having one or more processors, a user input (for example, a mouse, QWERTY keyboard, touch-screen, a graphics tablet, or microphone), and a communications infrastructure capable of receiving and transmitting data over a network. Such a computing device can be, for example and without limitation, a mobile phone, a personal digital assistant (PDA), a tablet computer, a laptop computer, a desktop computer, a workstation, a server, a cluster of computers (e.g., a server farm), or other similar type of device or system capable of processing instructions and receiving and transmitting data to and from humans and other computing devices. Although only recommendation engine 210, memory 220, GUI 230, and network interface 240 are shown in FIG. 2, it should be appreciated that system 200 may include additional components, modules, and/or sub-components as desired for a particular implementation.

It should also be appreciated that recommendation engine 210 may be implemented in software, firmware, hardware, or any combination thereof. Furthermore, embodiments of recommendation engine 210, or portions thereof, can be implemented to run on any type of processing device including, but not limited to, a computer, workstation, embedded system, networked device, mobile device, or other type of processor or computer system capable of carrying out the functionality described herein.

Memory 220 can be used to store information accessible by recommendation engine 210 for performing the automated seismic data processing workflow techniques disclosed herein. As shown in the example of FIG. 2, the information stored in memory 220 may include, but is not limited to, seismic project data 222, a sequence prediction model 224, and a parameter recommendation model 226. Memory 220 may be any type of recording medium coupled to an integrated circuit that controls access to the recording medium. The recording medium can be, for example and without limitation, a semiconductor memory, a hard disk, or other similar type of memory or storage device. Moreover, memory 220 may be integrated within system 200 or an external device communicatively coupled to system 200. In some implementations, memory 220 may be a remote cloud-based storage location communicatively coupled to system 200 over a network 204 via network interface 240.

Network 204 can be any type of network or combination of networks used to communicate information between different computing devices. Network 204 can include, but is not limited to, a wired (e.g., Ethernet) or a wireless (e.g., Wi-Fi and 3G) network. In addition, network 204 can include, but is not limited to, a local area network, medium area network, and/or wide area network such as the Internet.

In one or more embodiments, recommendation engine 210 may use GUI 230 to receive input relating to a specified data source or values of one or more input parameters from user 202 via a user input device (not shown), e.g., a mouse, keyboard, microphone, or touch-screen display. It should be appreciated that GUI 230 may provide any of various user control elements that user 202 can manipulate (e.g., with a user input device) for performing different actions associated with the seismic processing functionality described herein. GUI 230 may also be used to output information to user 202 based on the received input. The information may be presented to user 202 via a display (not shown) coupled to system 200. The display may be, for example and without limitation, a cathode ray tube (CRT) monitor, a liquid crystal display (LCD), or a touch-screen display, e.g., in the form of a capacitive touch-screen light emitting diode (LED) display. GUI 230 may be provided to user 202 by, for example, a seismic interpretation and imaging application executable at system 200.

In one or more embodiments, GUI 230 may be used to present a graphical representation of processed seismic data generated by data visualizer 218. The graphical representation may be presented by data visualizer 218 via, for example, a visualization window of GUI 230 rendered on the display. The displayed information may be used to perform any of various seismic data analysis and processing operations for purposes of seismic interpretation and imaging of different layers and stratigraphic features of the subsurface formation. Other hydrocarbon exploration and/or production operations may also be performed based on the seismic processing and interpretation. Examples of such operations include, but are not limited to, generating well placement or stimulation plans for drilling operations at one or more well sites, planning a trajectory of a wellbore to be drilled through different layers of the formation, and adjusting or optimizing the planned path or trajectory of the wellbore as it is drilled through the formation.

In one or more embodiments, recommendation engine 210 may perform various operations for modeling seismic processing workflows based on historical seismic project data (e.g., seismic project data 222 stored in memory 220) for purposes of automating a seismic processing workflow (or portions thereof) for processing seismic data associated with a current seismic project. For example, sequence prediction model 224 and parameter recommendation model 226 stored in memory 220 may be data-driven ML models generated by model builder 214 of recommendation engine 210 based on the analysis of seismic project data 222 performed by data analyzer 212.

In one or more embodiments, workflow predictor 216 of recommendation engine 210 may use sequence prediction model 224 and parameter recommendation model 226 to automate seismic data processing for a new seismic project. Workflow predictor 216 may use sequence prediction model 224 to predict or recommend an optimal processing sequence or optimal next step in the sequence for processing seismic data, where each processing step may include applying a geophysical algorithm to the data. Workflow predictor 216 may use parameter recommendation model 226 to recommend an optimal set of parameters of the geophysical algorithm for each step of the seismic data processing sequence recommended by sequence prediction model 224. In this way, recommendation engine 210 may be used to provide a complete predictive data-driven automated seismic processing solution.

While sequence prediction model 224 and parameter recommendation model 226 are used together in the above example, it should be appreciated that these are independent ML recommendation models that may be used separately, e.g., in separate seismic processing workflows for processing different seismic datasets. For example, recommendations produced by one or more of these models may be combined with input received from user 202 to process seismic data as part of a partially or semi-automated workflow. In some implementations, GUI 230 may be used to provide user 202 with a list of available geophysical algorithms to apply for processing a seismic dataset. User 202 may interact with GUI 230 to select a geophysical algorithm from the displayed list to process a seismic dataset of interest using the selected algorithm. A different algorithm may be selected by user 202 via GUI 230 for performing each step of a seismic data processing sequence while the optimal parameters for the user-selected algorithm may be predicted or recommended (automatically without any user intervention) by parameter recommendation model 226 of recommendation engine 210. Alternatively, the processing sequence and geophysical algorithms may be recommended automatically by sequence prediction model 224 of recommendation engine 210 while the set of parameters for one or more of the algorithms may be selected by user 202 via GUI 230. The parameters selected by user 202 may be, for example, a final set of parameters selected from an optimal range of parameter combinations recommended by parameter recommendation model 226 of recommendation engine 210. In one or more embodiments, the ML models used by recommendation engine 210 may be refined to improve the quality of recommendations or accuracy of predictions that they produce based on feedback provided by user 202 via GUI 230. In some implementations, recommendation engine 210 may also update the models to incorporate feedback received (e.g., via network 240 and network interface 240) from other users, e.g., geophysicists having domain expertise. In one or more embodiments, recommendation engine 210 may employ various modeling workflows to build and evaluate the workflow recommendation models for sequence prediction and parameter recommendation, as will be described in further detail below with respect to FIGS. 3-6.

Figure 3:
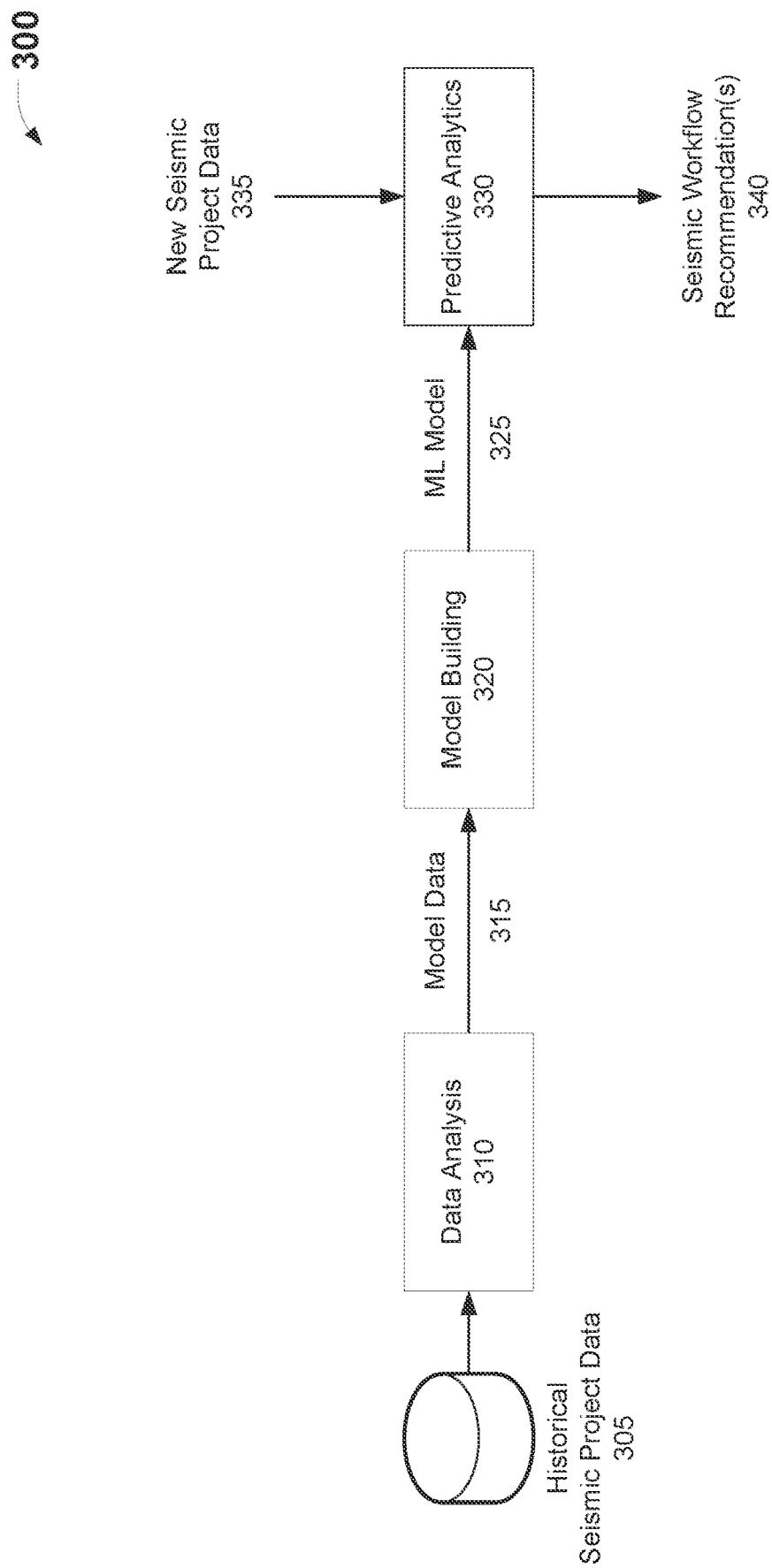
FIG. 3 is a flow diagram of an illustrative process for modeling seismic data processing workflows using a recommendation engine.

FIG. 3 is a flow diagram of an illustrative process 300 for modeling seismic data processing workflows using a recommendation engine, e.g., recommendation engine 210 of FIG. 2, as described above. For discussion purposes, process 300 will be described using system 200, including recommendation engine 210, of FIG. 2, as described above. However, process 300 is not intended to be limited thereto.

As shown in FIG. 3, process 300 includes a data analysis stage 310, a model building stage 320, and a predictive analytics stage 330. Process 300 may be performed by, for example, recommendation engine 210, as described above. Accordingly, the individual stages 310, 320, and 330 of process 300 in this example may be performed by data analyzer 212, model builder 214, and workflow predictor 216 of recommendation engine 210, respectively. The input to stage 310 may include historical seismic project data 305. Historical seismic project data 305 may include a historical record of seismic processing projects, including both proprietary and publicly available projects. Each seismic processing project may include one or more seismic data processing workflows performed for different seismic datasets. Historical seismic project data 305 may include, for example, information describing the sequence of steps or operations performed as part of each seismic processing workflow. Such information may include, but is not limited to, the specific geophysical algorithm and associated set of parameters applied at each step of the processing sequence along with a description of the corresponding output or outcome of performing that step on a particular seismic dataset.

In one or more embodiments, historical seismic project data 305 may be obtained from a data store, e.g., database 250 of FIG. 2, as described above. Database 250 may be, for example, a centralized data repository for storing historical seismic workflow data from previous seismic data processing projects, which has been accumulated over a period of time. In some implementations, historical project data 305 may be retrieved from database 250 via network 204 and stored as seismic project data 222 in memory 220 of system 200 of FIG. 2, as described above, before being provided as input to data analysis stage 310. As will be described in further detail below with reference to FIG. 4, data analysis stage 310 may include various data operations for extracting relevant information from historical seismic project data 305 and transforming the extracted information into model data 315. Model data 315 may include relevant portions of historical seismic project data (including historical seismic processing workflows) in a format suitable for building an ML model 325 (stage 320) and performing predictive analytics (stage 330).

In one or more embodiments, the ML model 325 generated by model building stage 320 may be input to predictive analytics stage 330. The output of predictive analytics stage 330 may be a set of seismic workflow recommendations 340. Seismic workflow recommendations 340 may include an optimized workflow for processing new seismic project data 335 associated with a new seismic project in addition to selected geophysical parameters for a geophysical algorithm to be used at each step of the optimized workflow. The seismic workflow recommendations 340 may be produced by predictive analytics stage 330 by applying ML model 325 to the new seismic project data 335. As will be described in further detail below, ML model 325 may be trained during the model building stage 320 to produce seismic workflow recommendations 340 for the new seismic project using historical seismic project data.

Figure 4:
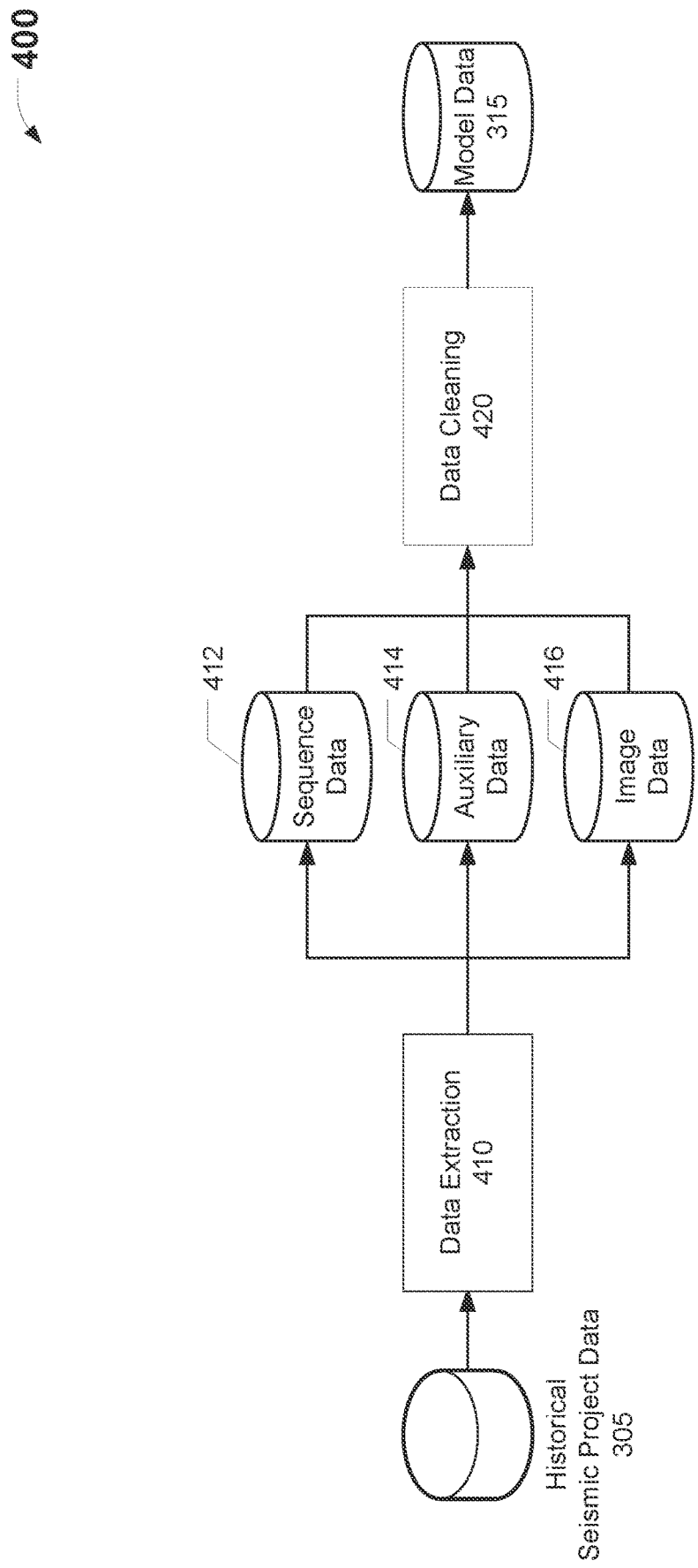
FIG. 4 is a flow diagram of an illustrative process for analyzing and transforming historical seismic project data into a format suitable for seismic workflow modeling.

FIG. 4 is a flow diagram of an illustrative process 400 for analyzing and transforming historical seismic project data into a format suitable for seismic workflow modeling. Process 400 may be used, for example, to implement data analysis stage 310 of workflow modeling process 300 of FIG. 3, as described above. As shown in FIG. 4, process 400 begins with a data extraction step 410 for extracting different types of workflow data from historical seismic project data 305. As described above, historical seismic project data 305 may include historical seismic processing workflows, where each workflow may include a sequence of individual processing steps in which a specific geophysical algorithm was applied to a seismic dataset according to an associated set of parameters. The number of steps in a processing sequence, their order of application, and the parameters used for each algorithm may vary depending on the seismic dataset being processed or the geological context and complexity of the subsurface formation represented by that dataset.

In step 410, a variety of historical seismic processing projects may be identified and used to extract sequence data 412. Sequence data 412 may include, for example, information pertaining to the processing sequences applied to different seismic datasets in each identified project. Such information may include, but is not limited to, the geophysical algorithm applied at each step of a historical processing sequence as well as the input data characteristics and parameters of the applied algorithm. In one or more embodiments, standard and engineered variables may be extracted for each algorithm independently. The engineered features may include, for example and without limitation, mathematical or statistical data transformations, statistics, or mathematical computations of derived variables, physics-informed or geophysics-informed variables, variables based on subject matter expert (SME) knowledge, logic, or rules, and/or a combination of these different variables.

In some implementations, certain features or variables may be selected as needed for purposes of model building and training in model building stage 320 of process 300 of FIG. 3, as described above and as will be described in further detail below. The features may be selected to build individual models for predicting parameters of each geophysical algorithm. Any of various standard techniques may be used to perform feature selection. Examples of such techniques include, but are not limited to, forward stepwise selection, backward stepwise selection, correlation analysis, lasso regression, ridge regression, elastic net regression or a combination of these or other such techniques. Additionally, features may also be selected based on domain knowledge or subject matter expertise.

In addition to sequence data 412, auxiliary data 414 may also be extracted from seismic project data 305. Auxiliary data 414 may include additional information in the form of metadata about the project itself. Examples of such metadata include, but are not limited to, the acquisition technology used to acquire the seismic data that was processed, when the seismic data was acquired, regional basin or sediment information, coordinates of the raw data, marine or land acquisition characteristics, energy source, oilfield operator, processing company, and any other relevant information pertaining to the seismic data or corresponding workflow and project in which the data was processed.

In one or more embodiments, the extracted information may further include image data 416, such as seismic images or traces that were processed as part of a historical seismic workflow. In some cases, image data 416 along with relevant parameter values identified as part of an input dataset for a geophysical algorithm applied during a historical seismic processing workflow may serve as input for training a data-driven ML model. The output dataset (or resulting images) after the algorithm was applied in this example may serve as target variable for the model. Accordingly, the ML model may be trained to predict the outcome of applying the algorithm to a new or current seismic dataset being processed, based on the information extracted from the historical seismic processing workflows, including, for example and without limitation, the input data, historically selected parameters values, and objective function of the algorithm. The input data (or image) may be used in its raw form or characteristics from the input data may be derived as features for model training purposes.

Once the information is extracted in step 410, process 400 then proceeds to step 420, which includes cleaning and preparing the extracted information, including the different types of workflow data (i.e., sequence data 412, auxiliary data 414, and image data 416), for model building purposes. The data cleaning in step 420 may include, for example, performing various quality checks on the data extracted in step 410, performing statistical analyses on the data, and identifying any outliers. In one or more embodiments, the data cleaning or quality checks performed in step 420 may vary depending on the type of data being cleaned. For example, the portions of sequence data 412 pertaining to all the variables (or features) of each geophysical algorithm may be identified and the identified data cleaned, processed, and prepared for model building purposes. Examples of variables for a given geophysical algorithm include, but are not limited to, the number of parameters that may be selected for the algorithm, the range of each parameter space, default values of parameters, types of input datasets, objective of the algorithm (if quantifiable and available), and information about the geographic area or basin from which seismic data processed using the algorithm was acquired. The objective of the algorithm may be, for example, to remove noise from the seismic data. The algorithm in this example may therefore be described or classified in terms of the amount, type, and location of noise that it can remove from a seismic dataset in addition to the geophysical challenges/complexity and context of the area from which the seismic data was collected. In one or more embodiments, this information (or a portion thereof) may be determined based on relevant portions of auxiliary data 414 that correspond to each seismic dataset and each geophysical algorithm applied to that dataset in the historical seismic processing sequences included within sequence data 412 as extracted in step 410.

Statistical analyses may be performed to gain insights about the count and type of geophysical algorithms included within sequence data 412 as well as categorizing algorithms into different classes based on their purpose. The statistical analyses may also include analyzing the count, type, and variation of parameter values for each algorithm across different historical seismic datasets. In addition to parameter values, the seismic datasets that were processed may be analyzed and categorized according to their individual characteristics. Further, information relating to the count (or quantity), type, and statistical variations of the input and output datasets that may be available for each algorithm may be performed. The statistical variations in the datasets may be attributable to various factors including, but not limited to, the level of diversity in the type of historical seismic projects available for analysis, the amount of data coverage for different basins, and the degree of geological complexity represented by that data.

In some implementations, each geophysical algorithm applied to a seismic dataset at each step of a historical seismic processing sequence may be associated with a seismic data processing tool or software application (e.g., a commercial seismic processing software program). For example, each algorithm may correspond to a specific tool or function provided by the seismic processing tool or application, which may be selected (e.g., via a GUI of the application) from among a plurality of available processing tools/functions and applied along with an associated set of configurable parameters to a seismic dataset at each step of a seismic processing sequence. Accordingly, each geophysical algorithm in this example may be identified by a corresponding tool name that may be specific to a particular seismic processing application. Likewise, each processing sequence may be identified by a series of tool names corresponding to the geophysical algorithms that are applied. These tool names may have abbreviated names or other identifiers, which may or may not be descriptive of the type of processing applied to the seismic data. Some of these processing tools/functions (and corresponding algorithms) may be identified by a variety of names across different seismic processing applications. Thus, different tool/function names associated with different software applications (or application providers) may refer to the same algorithm or an equivalent algorithm.

In one or more embodiments, the cleaning of sequence data 412 in step 420 may also include correcting any data anomalies or inconsistencies identified within the historical seismic processing sequences extracted in step 410. It should be appreciated that any of various deterministic or probabilistic techniques may be used to identify such data anomalies and that any data conversion operations or other adjustments for correcting data anomalies identified in the historical data may be performed as necessary or desired for a particular implementation.

In some cases, data anomalies may be due to one or more of the geophysical algorithms being associated with a seismic processing application that has become obsolete over time. In such cases, each obsolete tool name for an algorithm within sequence data 412 may be replaced with the name of an available equivalent algorithm associated with a current or existing application. In one or more embodiments, the equivalent algorithm may be the same algorithm under a different name or a different algorithm having a similar geophysical objective, which has been determined to be the most suitable replacement for the obsolete algorithm/tool based on the results of a statistical analysis, as described above. Thus, the cleaning and preparing of historical processing sequences in step 420 may include converting obsolete tool names to corresponding tool names associated with a current seismic application or geophysical algorithm thereof, e.g., as determined for each processing step of each historical processing sequence. Furthermore, the input data ingestion process for all the tools may be standardized to include a general step of obtaining input data from the extracted and cleaned historical processing sequences.

In one or more embodiments, step 420 may include merging the extracted and cleaned data into model data 315 for model building purposes. Model data 315 may be stored in a data repository. In some implementations, the data repository for storing model data 315 may be created across all projects containing information about all geophysical algorithms, set of selected values of algorithm parameters, datasets on which the algorithms are applied, and resulting datasets (if available) after applying geophysical algorithms. The data repository may be organized by geophysical algorithm, where information on algorithm parameters along with any auxiliary data may be stored with reference to an algorithm.

Referring back to FIG. 3, model data 315 output by the data analysis stage 310 of the workflow modeling process 300 may be provided as input to model building stage 320 for building at least one ML model 325, as will be described in further detail below with respect to FIG. 5.

Figure 5:
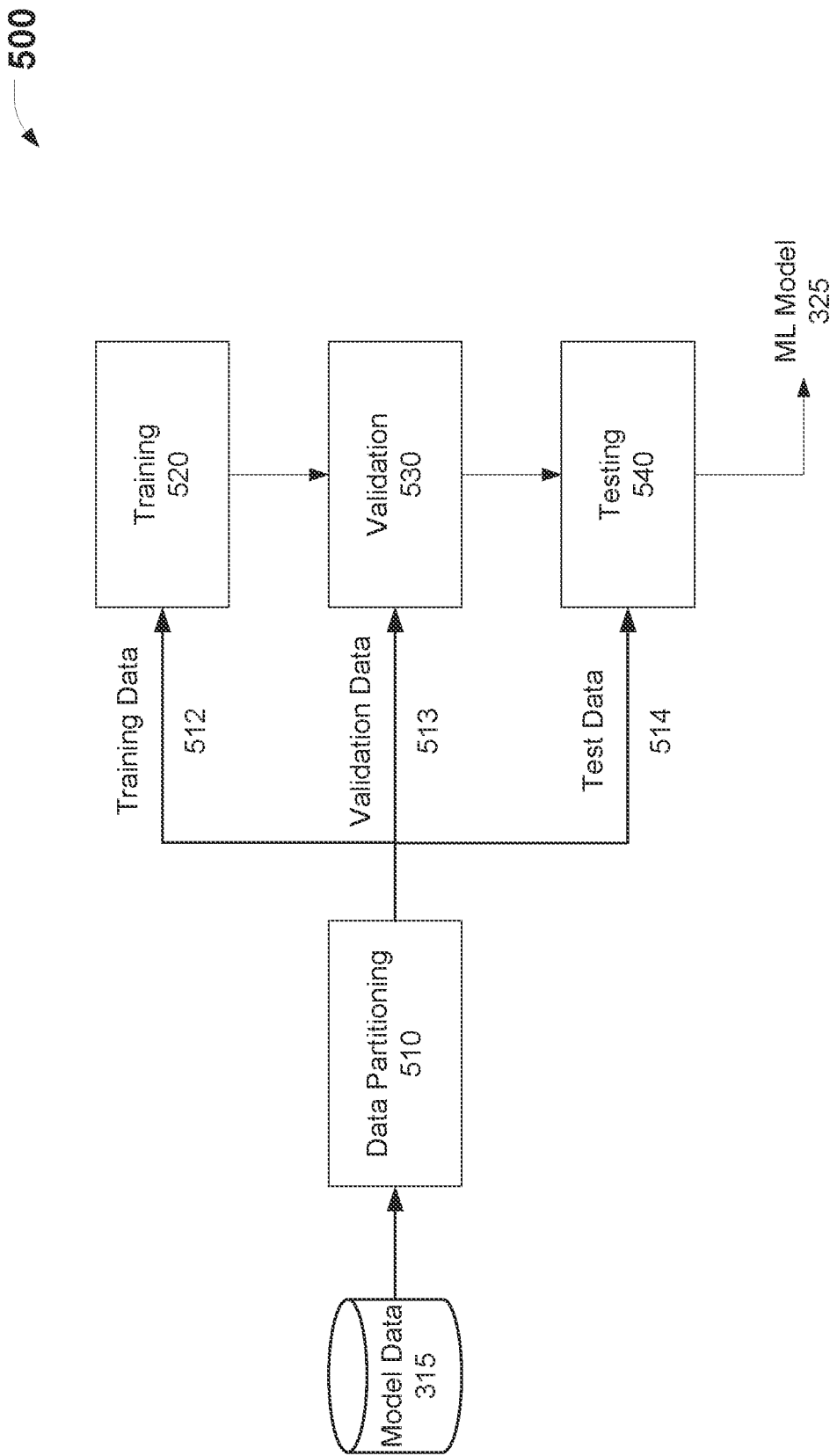
FIG. 5 is a flow diagram of an illustrative process for building a machine learning model for automating seismic workflows.

FIG. 5 is a flow diagram of an illustrative process 500 for building a ML model (e.g., ML model 325) for automating seismic workflows. Process 500 may be used to implement, for example, model building stage 320 of the workflow modeling process 300 of FIG. 3. As shown in FIG. 5, process 500 begins in step 510, which includes partitioning model data 315 into training data 512, validation data 513, and test data 514, which are provided as inputs to steps 520, 530, and 540 for training, validation, and testing of ML model 325, respectively. Each of training data 512, validation data 513, and test data 514 may include, for example, a different portion of the historical processing sequences that were extracted and cleaned using process 400 of FIG. 4, as described above. In step 520, training data 512 is leveraged to train and build the model. In step 530, validation data 513 is used to evaluate the trained model performance and assess different algorithms. In step 540, test data 514 serves as a "blind" dataset used to ensure model robustness and predictive power.

These data partitions may be created using either a random partition selection or with a clustering algorithm based on specific variables. The data partitions are then used to develop models to predict individual steps in a seismic processing sequence using sequence prediction algorithms Sequence prediction algorithms can be machine learning and/or deep learning based such as Recurrent Neural Networks (RNN), Long Short-Term Memory (LSTM), or graph-based methods such Dependency Graph, Compact Prediction Tree (CPT), or probabilistic methods such as Prediction by Partial Matching (PPM), Markov Chain. A variety of metrics may be used to quantify the model accuracy and efficiency to validate the trained model in step 530. In one or more embodiments, model performance may be evaluated using a cross-validation technique (e.g., 5-fold or 10-fold cross-validation).

In one or more embodiments, more than one ML model 325 may be generated using process 500. The generated ML models may include a sequence prediction model for predicting or recommending an optimal sequence of operations or steps to be performed for processing a current seismic dataset and a parameter recommendation model for recommending an optimal set of parameters for a specific geophysical algorithm to be used at each step of the processing sequence. The testing of each of these models in step 540 may vary depending on the type of model being tested.

In one or more embodiments, a sequence prediction model (as trained and validated in steps 520 and 530, respectively) may be tested in step 540 by providing the first m steps of at least one historical processing sequence selected from test data 514 as a variable for the model and then using the model to predict the remaining steps m+1, m+2, . . . , n of the processing sequence. In one or more embodiments, the number of steps in the processing sequence to be predicted by the model may be another variable provided as a pre-cursor for testing the model, based on the results of fitting the model to training data 512 during the training step 520. Alternatively, the number of steps in the processing sequence to be predicted may be a variable that can be specified by a user (e.g., user 202 via GUI 230 of FIG. 2, as described above) in step 530. In some implementations, the modeling approach used to build the model in steps 520, 530, and 540 may include leveraging additional data sources, such as historical input/output datasets for each processing algorithm, auxiliary data (such as features or variables) for workflow sequence prediction.

Given the complexity, geophysical context, specific purpose, and diverse parameter space associated with each geophysical algorithm, multiple parameter recommendation models may be trained in step 520 to optimize and recommend the parameters of a specific algorithm. In some cases, these individual models may have similarities of varying degree or may be completely different from each other based on the underlying geophysical algorithm for which they are built. An optimal model may then be selected and used to generate predictions or recommendations of optimal parameters for one or more of the geophysical algorithms in a seismic processing sequence to be applied to a seismic dataset. Furthermore, a variety of approaches may be used to train (and further refine if necessary) a parameter recommendation model in step 520. In one or more embodiments, the various approaches for training a parameter recommendation model include an unsupervised historical data matching approach using unsupervised machine learning, a supervised machine learning approach followed by an optimization technique, and a hybrid approach based on a combination of the unsupervised and supervised approaches.

In an example of the unsupervised historical data matching approach, historical data for each algorithm from similar projects are grouped together and parameter recommendations for a new seismic project or dataset are provided based on historical values from similar projects. The parameter recommendation model in this example may be trained using information pertaining to the algorithm extracted from historical seismic workflow data, as described above. Such information may include, for example and without limitation, algorithm parameters, their default values, selected values, input and output datasets, and auxiliary data (e.g., project details such as area, basin information, geological information, etc.). This information may be used to group similar parameter values together. In one or more embodiments, the parameter recommendation model may be trained to create groupings based on similarities between the input datasets of the algorithm, dataset characteristics, data acquisition characteristics, basin or regional sediment information, geological complexities, or other properties. Such a model can be trained using any of various machine learning techniques including, but not limited to, clustering techniques (e.g., K-Means Clustering, Hierarchical clustering, Density-based Clustering (such as Density-Based Spatial Clustering (DBSCAN)), Expectation-Maximization Clustering, and Fuzzy Clustering), distance-based similarity techniques (e.g., KNN, norm metric based, etc.), graph/network-based machine learning, and advanced deep learning techniques (e.g., Deep Autoencoders, Deep Embedded Clustering, Deep Adaptive Clustering, etc.). The parameter recommendation model may be used to provide parameter recommendations in various ways. For example, based on a new input dataset and other available information, the model may be used to find a scenario (e.g., a historical seismic project) from a generated grouping of the historical data (as described above) that is most like the new scenario and recommend parameter values for the geophysical algorithm to be applied in the new scenario based on its prior application for the historical dataset. Alternatively, the parameter recommendation model may be used find the top n scenarios, where n can be any predetermined or user-defined number (e.g., top 3 or top 5), which are most like the new scenario or seismic project and recommend optimal parameters, e.g., as options for a user to select the final set of parameters of a geophysical algorithm to apply to a new or current seismic dataset. In yet another example, the parameter recommendation model may be used find the top n scenarios matching to the new scenario and then run its own set of parameter combinations based on the matching scenarios to find the optimal parameter set. In the latter case, the model may be set up to find an optimal parameter combination that satisfies a pre-defined objective function.

In the supervised approach for testing a parameter recommendation model, historical data pertaining to the scenarios in which geophysical algorithms were applied to input datasets to produce corresponding output datasets may be used to mathematically quantify an objective function for the algorithm, which may represent the algorithm's intended purpose, e.g., to reduce noise in an area of a seismic image. In this approach, input datasets (seismic images or traces) along with selected parameter values from historical scenarios may serve as inputs to the model while the output datasets (or resulting images) after applying the algorithm serve as target variable to the model. A ML model may be trained to predict the outcome of the algorithm for a given set of input data based on historically selected parameter values and an objective function of the algorithm. The raw input data (e.g., a seismic image or trace) may be used as is or characteristics from the input data may be derived as features for model training purposes. Several statistical and mathematical modeling techniques such as linear regression, non-linear regression, support vector machines, random forest, gradient boost, decision trees, Bayesian modeling, or other similar approaches can be leveraged to build the model. Deep learning methods such as Convolution Neural Networks (CNN), Recurrent Neural Networks (RNN), or a hybrid of both or other similar techniques can also be leveraged to train the model.

The trained ML model may then be optimized based on a predefined objective function (or purpose of the specific geophysical algorithm), a predefined or user-selected list of the algorithm's parameters, and predefined or user-defined constraints for these parameters. These constraints may include the geological or geophysical context, operational feasibility, algorithm constraints, or other user specific needs. An optimization algorithm such as Genetic Algorithm, Pattern Search, Differential Evolution, Stochastic Optimization, Bayesian Optimization, etc. may be applied to the list of parameters within the provided constraints to generate multiple iterations and scenarios to optimize the pre-defined objective function. The model may be used to recommend either an optimal (or best possible) set of parameters or provide a list of possible parameter values to consider for the algorithm. In the case of a noise removing geophysical algorithm, the model can recommend the parameters of the noise removing algorithm to clean the desired segment of the data. Users can also provide their estimates and ranges for the parameters in the list to optimize and create custom scenarios for selecting the parameter values. Any user provided values may be tested and validated for the given constraints. In some implementations, user input may be limited to the development or model-building phase and any geophysical parameter recommendations may be provided by the model automatically without any further user intervention.

In the hybrid approach for testing a parameter recommendation model, the unsupervised and supervised approaches described above may be combined in various ways. For example, an unsupervised historical data matching approach may be initially used to configure the model to recommend parameter values for a specified algorithm, and the recommended values may then be used as initial values that satisfy the constraints in the supervised optimization approach described above. This may help with initialization of the optimization algorithm and may help in fast convergence to the optimal solution. In another example, the supervised optimization approach may be used to optimize the set of parameters from a set of top n scenarios identified using the unsupervised historical data matching approach, as described above.

Figure 6:
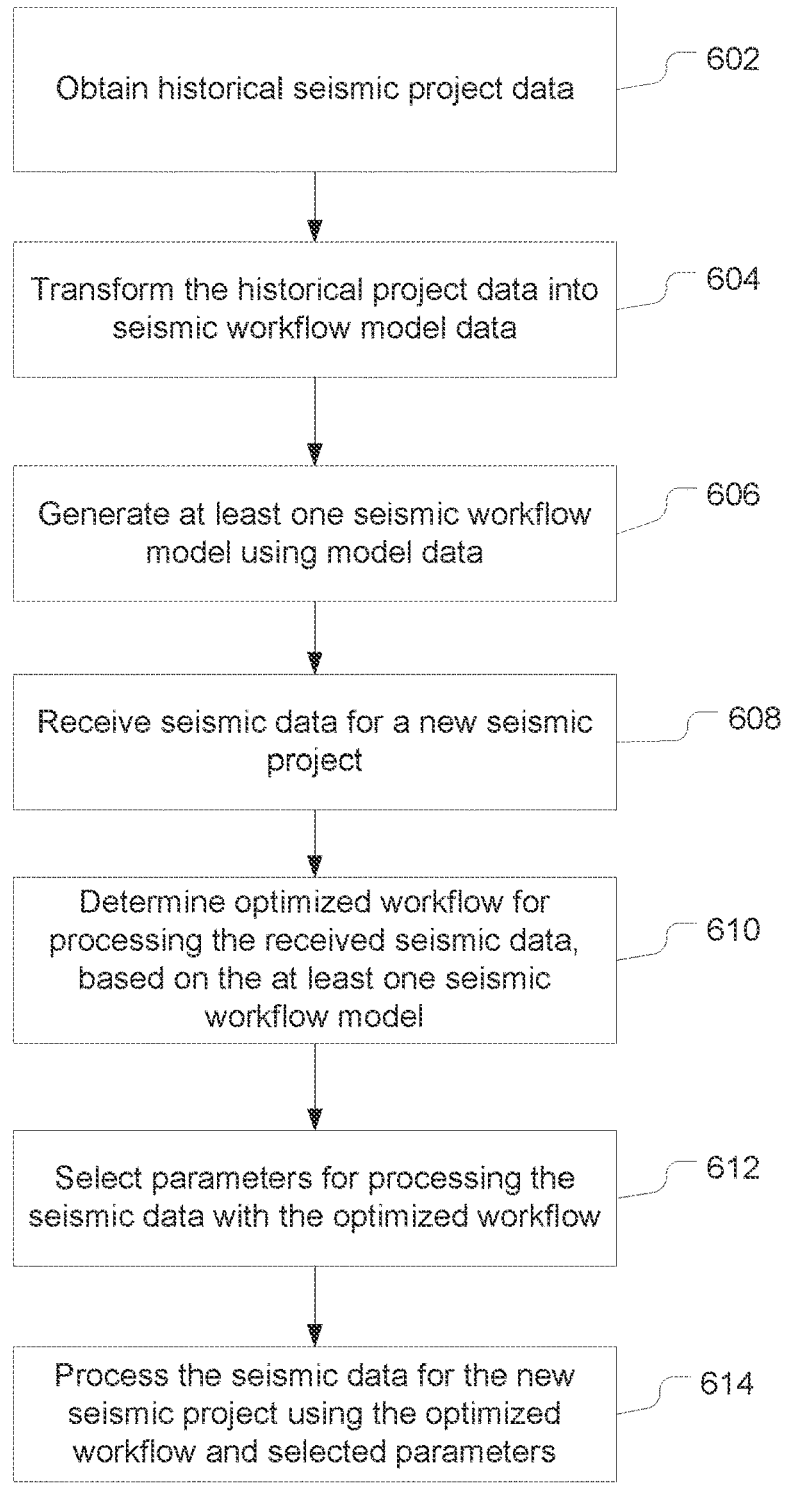
FIG. 6 is a flowchart of an illustrative process for automating seismic data processing using a recommendation engine.

FIG. 6 is a flowchart of an illustrative process 600 for automating seismic data processing using a recommendation engine (e.g., recommendation engine 210 of FIG. 2, as described above). As shown in FIG. 6, process 600 begins in step 602, which includes obtaining historical seismic project data, including historical seismic workflow data comprising historical seismic processing sequences applied to different seismic datasets. Such data may be associated with one or more historical seismic projects. It should be appreciated that the historical seismic project and workflow data may be obtained from any of various seismic data sources for any number of hydrocarbon producing fields located anywhere in the world.

In step 604, the historical data is transformed into seismic workflow model data for seismic workflow modeling. In one or more embodiments, the data transformation in step 604 may include analyzing the historical data to identify a processing sequence for each of a plurality of seismic datasets, extracting, from the historical seismic project data, information corresponding to the identified processing sequence for each seismic dataset based on the analysis, and cleaning the extracted information for each seismic dataset to generate the seismic workflow model data. The extracted information may include, for example, a geophysical algorithm and associated parameters used to process each seismic dataset in a corresponding historical seismic processing workflow.

In step 606, at least one seismic workflow model is generated using the seismic workflow model data from step 604. In one or more embodiments, step 606 may include generating a sequence prediction model and a parameter recommendation model, as described above.

In step 608, seismic data is received for a new seismic project.

In step 610, an optimal/optimized workflow for processing the received seismic data is determined, e.g., using the generated seismic workflow model.

In step 612, parameters of a geophysical algorithm (or "geophysical parameters") are selected for processing the seismic data in the optimized workflow.

In step 614, the seismic data for the new wellsite is processed using the optimized workflow with the selected geophysical parameters.

Figure 7:
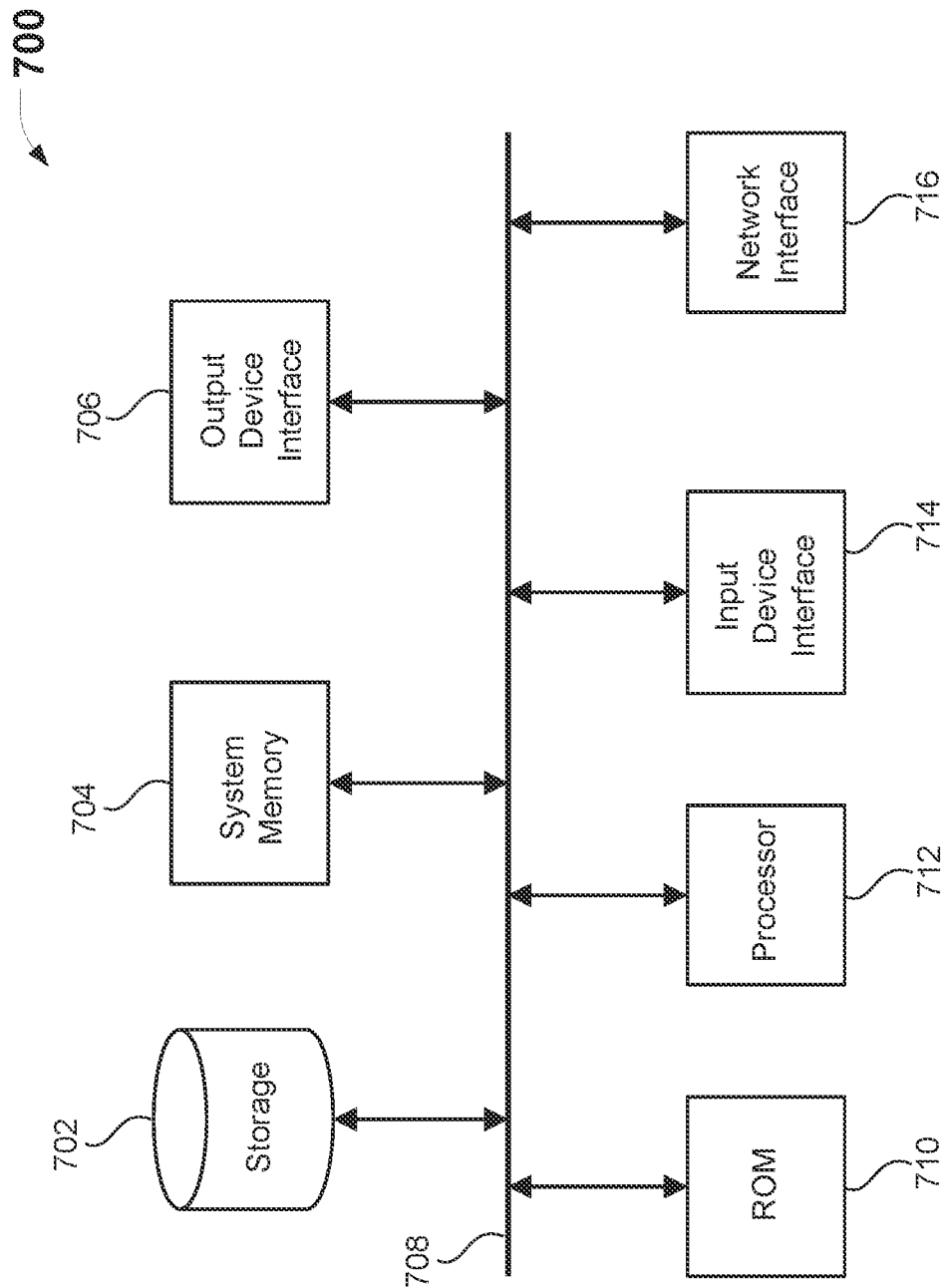
FIG. 7 is a block diagram of an exemplary computer system in which embodiments of the present disclosure may be implemented.

FIG. 7 is a block diagram of an exemplary computer system 700 in which embodiments of the present disclosure may be implemented. For example, system 200 of FIG. 2 and processes 300, 400, 500 and 600 of FIGS. 3, 4, 5 and 6, respectively, as described above, may be implemented using system 700. System 700 can be a computer, phone, PDA, or any other type of electronic device. Such an electronic device includes various types of computer readable media and interfaces for various other types of computer readable media. As shown in FIG. 7, system 700 includes a permanent storage device 702, a system memory 704, an output device interface 706, a system communications bus 708, a read-only memory (ROM) 710, processing unit(s) 712, an input device interface 714, and a network interface 716.

Bus 708 collectively represents all system, peripheral, and chipset buses that communicatively connect the numerous internal devices of system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of system 700. Permanent storage device 702, on the other hand, is a read-and-write memory device. This device is a non-volatile memory unit that stores instructions and data even when system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such a random access memory. System memory 704 stores some of the instructions and data that the processor needs at runtime. In some implementations, the processes of the subject disclosure are stored in system memory 704, permanent storage device 702, and/or ROM 710. For example, the various memory units include instructions for performing the automated seismic data processing techniques disclosed herein. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the system 700. Input devices used with input device interface 714 include, for example, alphanumeric, QWERTY, or T9 keyboards, microphones, and pointing devices (also called "cursor control devices"). Output device interfaces 706 enables, for example, the display of images generated by the system 700. Output devices used with output device interface 706 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 7, bus 708 also couples system 700 to a public or private network (not shown) or combination of networks through a network interface 716. Such a network may include, for example, a local area network ("LAN"), such as an Intranet, or a wide area network ("WAN"), such as the Internet. Any or all components of system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of processes 300, 400, 500 and 600 of FIGS. 3, 4, 5 and 6, respectively, as described above, may be implemented using system 700 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN"), a wide area network ("WAN"), an inter-network (e.g., the Internet), peer-to-peer networks (e.g., ad hoc peer-to-peer networks), and cloud computing networks.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for automating seismic data processing workflows. Accordingly, advantages of the present disclosure include providing a robust, scalable, time-efficient, and data-driven solution for processing seismic volumes.

In one embodiment of the present disclosure, a computer-implemented method for automated seismic processing includes: obtaining, by a computing device from a data store, historical seismic project data associated with one or more historical seismic projects; transforming, by the computing device, the historical seismic project data into seismic workflow model data; generating at least one seismic workflow model using the seismic workflow model data; responsive to receiving seismic data for a new seismic project, determining an optimized workflow for processing the received seismic data, based on the at least one generated seismic workflow model; selecting geophysical parameters for processing the seismic data with the optimized workflow; and processing, by the computing device, the seismic data for the new seismic project using the optimized workflow and the selected geophysical parameters. In another embodiment, a computer-readable storage medium with instructions stored therein, where the instructions, when executed by a computer, cause the computer to perform a plurality of functions, including functions to: obtain, from a data store, historical seismic project data associated with one or more historical seismic projects; transform the historical seismic project data into seismic workflow model data; generate at least one seismic workflow model using the seismic workflow model data; receive seismic data for a new seismic project; determine an optimized workflow for processing the received seismic data, based on the at least one generated seismic workflow model; select geophysical parameters for processing the seismic data with the optimized workflow; and process the seismic data for the new seismic project using the optimized workflow and the selected geophysical parameters.

Other embodiments of the foregoing method and computer-readable storage medium may include any one of the following functions, operations or elements, alone or in combination with each other: the at least one seismic workflow model is one of a plurality of seismic workflow recommendation models, the plurality of seismic workflow recommendation models include a seismic prediction model and a parameter recommendation model, the seismic prediction model is used for determining the optimized workflow for processing the received seismic data, and the parameter recommendation model is used for recommending the geophysical parameters to be used with the optimized workflow; transforming the historical seismic project data comprises analyzing the historical seismic project data to identify a processing sequence for each of a plurality of seismic datasets, extracting from the historical seismic project data information corresponding to the identified processing sequence for each seismic dataset based on the analysis, the extracted information including a geophysical algorithm and associated parameters used to process each seismic dataset, and cleaning the extracted information for each seismic dataset to generate the seismic workflow model data; the analyzing includes performing a statistical analysis of the historical seismic project data; the historical seismic project data includes a record of each seismic data processing workflow performed for the one or more historical seismic projects, the record includes information pertaining to each step in a sequence of steps performed for processing a seismic dataset as part of the corresponding seismic data processing workflow, and the information includes a description of each geophysical algorithm used during the sequence of steps and parameters associated with that geophysical algorithm; the information for each seismic data processing workflow further includes metadata about characteristics of the seismic dataset and seismic tool used for acquisition of the seismic dataset; the metadata includes acquisition characteristics of the seismic tool, acquisition time, acquisition location, geological characteristics of the acquisition location, and operator information for the seismic tool; the at least one seismic workflow model is a machine learning model; and generating the at least one seismic workflow model includes partitioning the seismic workflow model data into one or more datasets for the machine learning model to be generated, the one or more datasets including a training dataset for training the at least one seismic workflow model, a validation dataset for validating the at least one seismic workflow model after training, and a test dataset for testing an output of the at least one seismic workflow model based on an input dataset derived from the historical seismic project data.

In a further embodiment, a system for automated seismic processing includes a processor and a memory coupled to the processor that has instructions stored therein, which, when executed by the processor, cause the processor to perform functions, including functions to: obtain, from a data store, historical seismic project data associated with one or more historical seismic projects; transform the historical seismic project data into seismic workflow model data; generate at least one seismic workflow model using the seismic workflow model data; receive seismic data for a new seismic project; determine an optimized workflow for processing the received seismic data, based on the at least one generated seismic workflow model; select geophysical parameters for processing the seismic data with the optimized workflow; and process the seismic data for the new seismic project using the optimized workflow and the selected geophysical parameters.

Other embodiments of the foregoing system may include any one of the following functions, operations or elements, alone or in combination with each other: the at least one seismic workflow model is one of a plurality of seismic workflow recommendation models, the plurality of seismic workflow recommendation models include a seismic prediction model and a parameter recommendation model, the seismic prediction model is used for determining the optimized workflow for processing the received seismic data, and the parameter recommendation model is used for recommending the geophysical parameters to be used with the optimized workflow; transforming the historical seismic project data comprises analyzing the historical seismic project data to identify a processing sequence for each of a plurality of seismic datasets, extracting from the historical seismic project data information corresponding to the identified processing sequence for each seismic dataset based on the analysis, the extracted information including a geophysical algorithm and associated parameters used to process each seismic dataset, and cleaning the extracted information for each seismic dataset to generate the seismic workflow model data; the analyzing includes performing a statistical analysis of the historical seismic project data; the historical seismic project data includes a record of each seismic data processing workflow performed for the one or more historical seismic projects, the record includes information pertaining to each step in a sequence of steps performed for processing a seismic dataset as part of the corresponding seismic data processing workflow, and the information includes a description of each geophysical algorithm used during the sequence of steps and parameters associated with that geophysical algorithm; the information for each seismic data processing workflow further includes metadata about characteristics of the seismic dataset and seismic tool used for acquisition of the seismic dataset; the metadata includes acquisition characteristics of the seismic tool, acquisition time, acquisition location, geological characteristics of the acquisition location, and operator information for the seismic tool; the at least one seismic workflow model is a machine learning model; and generating the at least one seismic workflow model includes partitioning the seismic workflow model data into one or more datasets for the machine learning model to be generated, the one or more datasets including a training dataset for training the at least one seismic workflow model, a validation dataset for validating the at least one seismic workflow model after training, and a test dataset for testing an output of the at least one seismic workflow model based on an input dataset derived from the historical seismic project data.

While specific details about the above embodiments have been described, the above hardware and software descriptions are intended merely as example embodiments and are not intended to limit the structure or implementation of the disclosed embodiments. For instance, although many other internal components of the system 700 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The embodiments of the present disclosure have been presented for purposes of illustration and description but are not intended to be exhaustive or limited to the forms described. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A computer-implemented method for automated seismic processing, the method comprising:
   obtaining, by a computing device from a data store, historical seismic project data associated with one or more historical seismic projects;
   transforming, by the computing device, the historical seismic project data into seismic workflow model data;
   generating at least one seismic workflow model using the seismic workflow model data;
   responsive to receiving seismic data for a new seismic project, determining an optimized workflow for processing the received seismic data, based on the at least one generated seismic workflow model;
   selecting geophysical parameters for processing the seismic data with the optimized workflow; and
   processing, by the computing device, the seismic data for the new seismic project using the optimized workflow and the selected geophysical parameters.

2. The method of claim 1, wherein the at least one seismic workflow model is one of a plurality of seismic workflow recommendation models, the plurality of seismic workflow recommendation models include a seismic prediction model and a parameter recommendation model, the seismic prediction model is used for determining the optimized workflow for processing the received seismic data, and the parameter recommendation model is used for recommending the geophysical parameters to be used with the optimized workflow.

3. The method of claim 1, wherein transforming the historical seismic project data comprises:
   analyzing the historical seismic project data to identify a processing sequence for each of a plurality of seismic datasets;
   extracting, from the historical seismic project data, information corresponding to the identified processing sequence for each seismic dataset, based on the analysis, the extracted information including a geophysical algorithm and associated parameters used to process each seismic dataset; and
   cleaning the extracted information for each seismic dataset to generate the seismic workflow model data.

4. The method of claim 3, wherein the analyzing includes performing a statistical analysis of the historical seismic project data.

5. The method of claim 1, wherein the historical seismic project data includes a record of each seismic data processing workflow performed for the one or more historical seismic projects, the record includes information pertaining to each step in a sequence of steps performed for processing a seismic dataset as part of the corresponding seismic data processing workflow, and the information includes a description of each geophysical algorithm used during the sequence of steps and parameters associated with that geophysical algorithm.

6. The method of claim 5, wherein the information for each seismic data processing workflow further includes metadata about characteristics of the seismic dataset and seismic tool used for acquisition of the seismic dataset.

7. The method of claim 6, wherein the metadata includes acquisition characteristics of the seismic tool, acquisition time, acquisition location, geological characteristics of the acquisition location, and operator information for the seismic tool.

8. The method of claim 1, wherein the at least one seismic workflow model is a machine learning model, and generating the at least one seismic workflow model includes partitioning the seismic workflow model data into one or more datasets for the machine learning model to be generated, the one or more datasets including a training dataset for training the at least one seismic workflow model, a validation dataset for validating the at least one seismic workflow model after training, and a test dataset for testing an output of the at least one seismic workflow model based on an input dataset derived from the historical seismic project data.

9. A system for automated seismic processing, the system comprising:
   a processor; and
   a memory coupled to the processor, the memory having instructions stored therein, which, when executed by the processor, cause the processor to perform a plurality of functions, including functions to:

obtain, from a data store, historical seismic project data associated with one or more historical seismic projects;

transform the historical seismic project data into seismic workflow model data;

generate at least one seismic workflow model using the seismic workflow model data;

receive seismic data for a new seismic project;

determine an optimized workflow for processing the received seismic data, based on the at least one generated seismic workflow model;

select geophysical parameters for processing the seismic data with the optimized workflow; and process the seismic data for the new seismic project using the optimized workflow and the selected geophysical parameters.

10. The system of claim 9, wherein the at least one seismic workflow model is one of a plurality of seismic workflow recommendation models, the plurality of seismic workflow recommendation models include a seismic prediction model and a parameter recommendation model, the seismic prediction model is used for determining the optimized workflow for processing the received seismic data, and the parameter recommendation model is used for recommending the geophysical parameters to be used with the optimized workflow.

11. The system of claim 9, wherein the plurality of functions performed by the processor further include functions to:

analyze the historical seismic project data to identify a processing sequence for each of a plurality of seismic datasets;

extract, from the historical seismic project data, information corresponding to the identified processing sequence for each seismic dataset, based on the analysis, the extracted information including a geophysical algorithm and associated parameters used to process each seismic dataset; and clean the extracted information for each seismic dataset to generate the seismic workflow model data.

12. The system of claim 11, wherein the plurality of functions performed by the processor include functions to: perform a statistical analysis of the historical seismic project data.

13. The system of claim 9, wherein the historical seismic project data includes a record of each seismic data processing workflow performed for the one or more historical seismic projects, the record includes information pertaining to each step in a sequence of steps performed for processing a seismic dataset as part of the corresponding seismic data processing workflow, and the information includes a description of each geophysical algorithm used during the sequence of steps and parameters associated with that geophysical algorithm.

14. The system of claim 13, wherein the information for each seismic data processing workflow further includes metadata about characteristics of the seismic dataset and seismic tool used for acquisition of the seismic dataset, and the metadata includes acquisition characteristics of the seismic tool, acquisition time, acquisition location, geological characteristics of the acquisition location, and operator information for the seismic tool.

15. The system of claim 9, wherein the at least one seismic workflow model is a machine learning model, and the plurality of functions performed by the processor further include functions to:

generate the at least one seismic workflow model includes partitioning the seismic workflow model data into one or more datasets for the machine learning model to be generated, the one or more datasets including a training dataset for training the at least one seismic workflow model, a validation dataset for validating the at least one seismic workflow model after training, and a test dataset for testing an output of the at least one seismic workflow model based on an input dataset derived from the historical seismic project data.

16. A computer-readable storage medium having instructions stored therein, which, when executed by a computer, cause the computer to perform a plurality of functions, including functions to:

obtain, from a data store, historical seismic project data associated with one or more historical seismic projects, the historical seismic project data including a record of each seismic data processing workflow performed for the one or more historical seismic projects, the record including information pertaining to each step in a sequence of steps performed for processing a seismic dataset as part of the corresponding seismic data processing workflow, and the information including a description of each geophysical algorithm and associated parameters used during the sequence of steps;

transform the historical seismic project data into seismic workflow model data;

generate at least one seismic workflow model using the seismic workflow model data;

receive seismic data for a new seismic project;

determine an optimized workflow for processing the received seismic data, based on the at least one generated seismic workflow model;

select geophysical parameters for processing the seismic data with the optimized workflow; and process the seismic data for the new seismic project using the optimized workflow and the selected geophysical parameters.

17. The computer-readable storage medium of claim 16, wherein the at least one seismic workflow model is one of a plurality of seismic workflow recommendation models, the plurality of seismic workflow recommendation models include a seismic prediction model and a parameter recommendation model, the seismic prediction model is used for determining the optimized workflow for processing the received seismic data, and the parameter recommendation model is used for recommending the geophysical parameters to be used with the optimized workflow.

18. The computer-readable storage medium of claim 16, wherein the plurality of functions performed by the computer further include functions to:

analyze the historical seismic project data to identify a processing sequence for each of a plurality of seismic datasets;

extract, from the historical seismic project data, information corresponding to the identified processing sequence for each seismic dataset, based on the analysis, the extracted information including a geophysical algorithm and associated parameters used to process each seismic dataset; and clean the extracted information for each seismic dataset to generate the seismic workflow model data.

19. The computer-readable storage medium of claim 16, wherein the information for each seismic data processing workflow further includes metadata about characteristics of the seismic dataset and seismic tool used for acquisition of the seismic dataset, and the metadata includes acquisition characteristics of the seismic tool, acquisition time, acquisition location, geological characteristics of the acquisition location, and operator information for the seismic tool.

20. The computer-readable storage medium of claim 16, wherein the at least one seismic workflow model is a machine learning model, and the plurality of functions performed by the computer further include functions to:
  generate the at least one seismic workflow model includes partitioning the seismic workflow model data into one or more datasets for the machine learning model to be generated, the one or more datasets including a training dataset for training the at least one seismic workflow model, a validation dataset for validating the at least one seismic workflow model after training, and a test dataset for testing an output of the at least one seismic workflow model based on an input dataset derived from the historical seismic project data.

* * * * *